J. J. KING.
SANITARY WAGON TOP.
APPLICATION FILED JUNE 16, 1914.
1,127,019.
Patented Feb. 2, 1915.
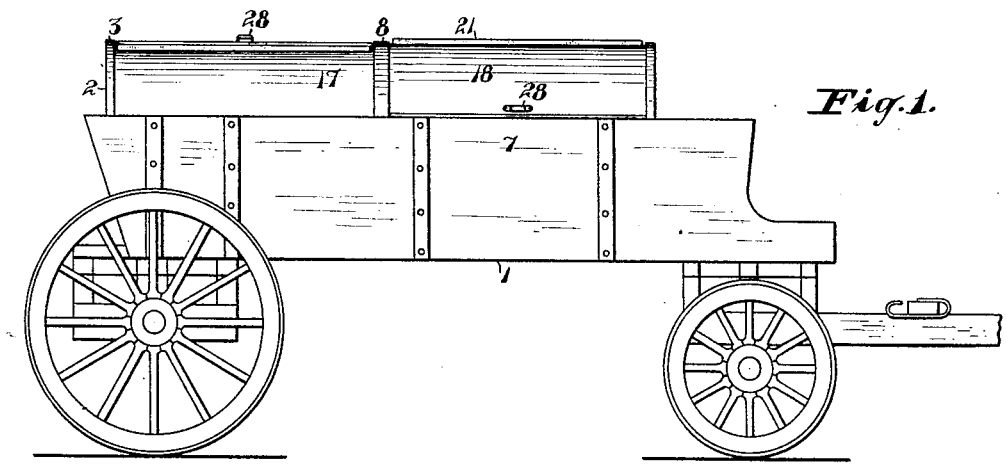
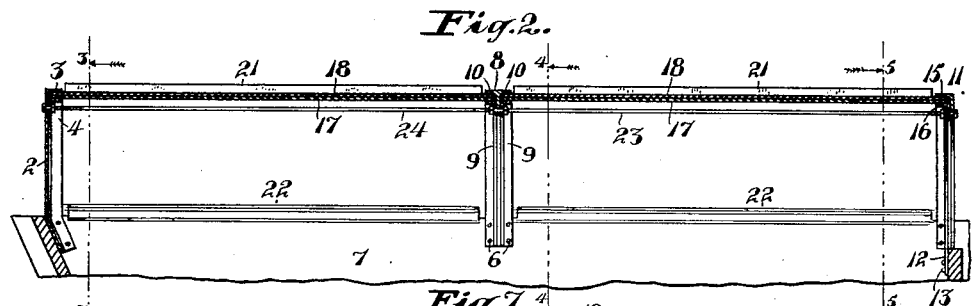
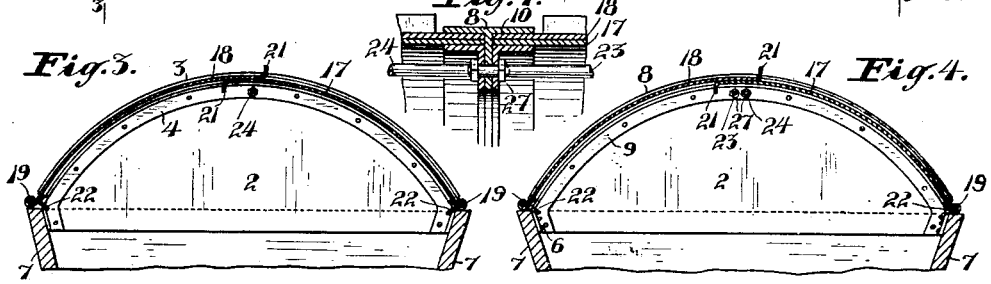
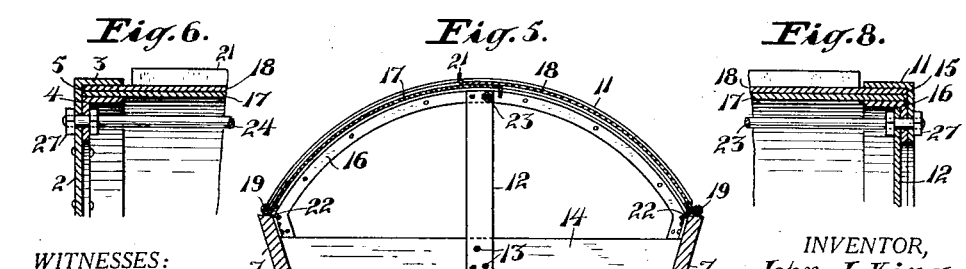
WITNESSES:
F. C. Fliedner
G. N. Ball.
INVENTOR,
John J. King.
BY
Francis M. Wright,
ATTORNEY

UNITED STATES PATENT OFFICE.

JOHN J. KING, OF SAN FRANCISCO, CALIFORNIA, ASSIGNOR OF TWO-THIRDS TO JOSEPH A. MOORE, TRUSTEE, OF SAN FRANCISCO, CALIFORNIA.

SANITARY WAGON-TOP.

1,127,019. Specification of Letters Patent. Patented Feb. 2, 1915.

Application filed June 16, 1914. Serial No. 845,380.

*To all whom it may concern:*

Be it known that I, JOHN J. KING, a citizen of the United States, residing at San Francisco, in the county of San Francisco and State of California, have invented new and useful Improvements in Sanitary Wagon-Tops, of which the following is a specification.

The present invention relates to improvements in vehicles, and especially in that class of vehicles known as dust carts or carts used in the street-cleaning departments of cities.

The object of the invention is to provide, in a cart of this character, improved means for covering the same, whereby there are provided openings at either side of the top of the cart for shoveling the dust or dirt thereinto, while the remainder of the top of the cart is closed.

In the accompanying drawing, Figure 1 is a broken side view of the cart; Fig. 2 is an enlarged longitudinal section of the upper portion thereof; Figs. 3, 4 and 5 are vertical transverse sections on the lines 3—3, 4—4 and 5—5 respectively; Figs. 6, 7 and 8 are enlarged sectional detail views.

Referring to the drawings, 1 indicates the body of a cart, used, for instance, for collecting the dust and street sweepings. To the rear end of said body is secured a sheet metal plate 2, the upper edge of which is curved in a circular arc and has a forwardly extending flange 3. Riveted to said plate is an angle iron 4, in the form of an arc of a circle concentric with the flange 3, and extending entirely across the cart, the forwardly extending flange of said angle iron forming, with the flange 3, a curved groove 5 of uniform width throughout its length. Secured by rivets 6 to the sides 7 of the cart substantially at their middle are the terminal portions of a T-bar 8 of the form of a circular arc of the same radius as the edge of the plate 2, and extending entirely across the top of the cart. Riveted to opposite sides of the central member of said T-bar are angle-irons 9, the free members of said angle-irons being spaced from the flanges of said T-bar to form grooves 10 of the same width as the grooves 5. Riveted to the sides of the body of the wagon near their front ends are the ends of an angle-iron 11, having a rearwardly extending horizontal flange and the upper portion of which is circularly curved similarly to the edge of the plate 2 and to the T-bar 8, the middle of said angle-iron being riveted to the upper end of a vertical bar 12, the lower end of which is riveted, as shown at 13, to the front end of the dust receptacle 14. To said angle-iron 11 is riveted a smaller angle-iron 16, having a rearwardly extending horizontal flange spaced from the flange of the angle-iron 11 to provide a groove 15 of the same width as the grooves 5 and 10. In the groove 15 and the front groove 10, and also in the rear groove 10 and the groove 5 can slide the front and rear edges of pairs of curved shutters 17, 18, their curvature being such that they can slide freely in the curved grooves, the shutters 18 sliding over, or outside of, the shutters 17. The outer edges of the shutters, which rest upon the tops of the sides of the body of the cart, are outwardly beaded around round rods 19. The inner edges of the outer shutters 18 are bent outwardly at right angles, except where they are within the grooves, to form strengthening ribs 21, and the inner edges of the inner shutters 17 are likewise bent inwardly at right angles for the same purpose. To the inner surfaces of the shutters, near their outer edges, are riveted angle-plates 22, the free sides of which can abut against the inner surfaces of the upper portions of the sides 7, when the shutters are closed.

To maintain the grooves at the proper distance apart, so that the shutters can slide properly therein, there are provided longitudinal spacing rods 23, 24, the spacing rods 23 extending through the angle-irons 11, 16 on one side of the middle of the cart and through the T-bar 8 and angle-irons 9, on the same side of the middle, and having four nuts 27 screwed thereon, on opposite sides of said angle-irons and T-bar, and the rod 24 extending through the T-bar 8 and angle-irons 9, on the other side of the middle, and also through the end plate 2 and angle-iron 4, and having four nuts 27 screwed thereon on opposite sides of said angle-irons and T-bar.

Handles 28 are secured on the outer surfaces of the shutters near the middles of their outer edges for conveniently closing and opening them.

It will be readily seen that, with this construction, any quarter of the top of the cart can be opened for the purpose of shoveling dirt thereinto, the other three quarters remaining closed, or any two quarters may be opened on either side of the cart for this purpose. This is a great advantage, as it greatly reduces the amount of dirt that is blown out of the cart during the operation of filling the same. The shutters of each pair lap one over the other to effectually prevent the escape of dust therefrom, and also to retain the shutters in the proper position for sliding. The construction is such that it can readily be applied to the top of an ordinary cart.

I claim:—

In means for closing the top of a cart, a metal rear wall secured to the rear end of the cart body and having an upper arcuate marginal groove, arcuate angle irons at the front end of the cart, of which the ends are secured to the sides of the cart and having rearwardly extending flanges uniformly spaced from one another to form a groove, a standard, of which the lower end is secured to the cart and the upper end to said angle irons, an arcuate T-bar, and angle irons secured to opposite sides of the central member thereof, to form oppositely directed grooves, the ends of said bar being secured to the middle of the sides of the cart, longitudinal spacing rods both extending through and secured to said T-bar and the angle irons secured thereto, one extending through, and secured to, the rear wall, and the other extending through, and secured to, the standard and the angle irons secured thereto, and pairs of shutters having transverse arcuate edges in said grooves, one shutter of each pair being outside of the other.

In testimony whereof I have hereunto set my hand in the presence of two subscribing witnesses.

JOHN J. KING.

Witnesses:
 G. M. BALL,
 D. B. RICHARDS.

Copies of this patent may be obtained for five cents each, by addressing the "Commissioner of Patents, Washington, D. C."